(No Model.)   2 Sheets—Sheet 2.
T. A. EDISON.
SYSTEM OF ELECTRICAL DISTRIBUTION.
No. 369,441. Patented Sept. 6, 1887.
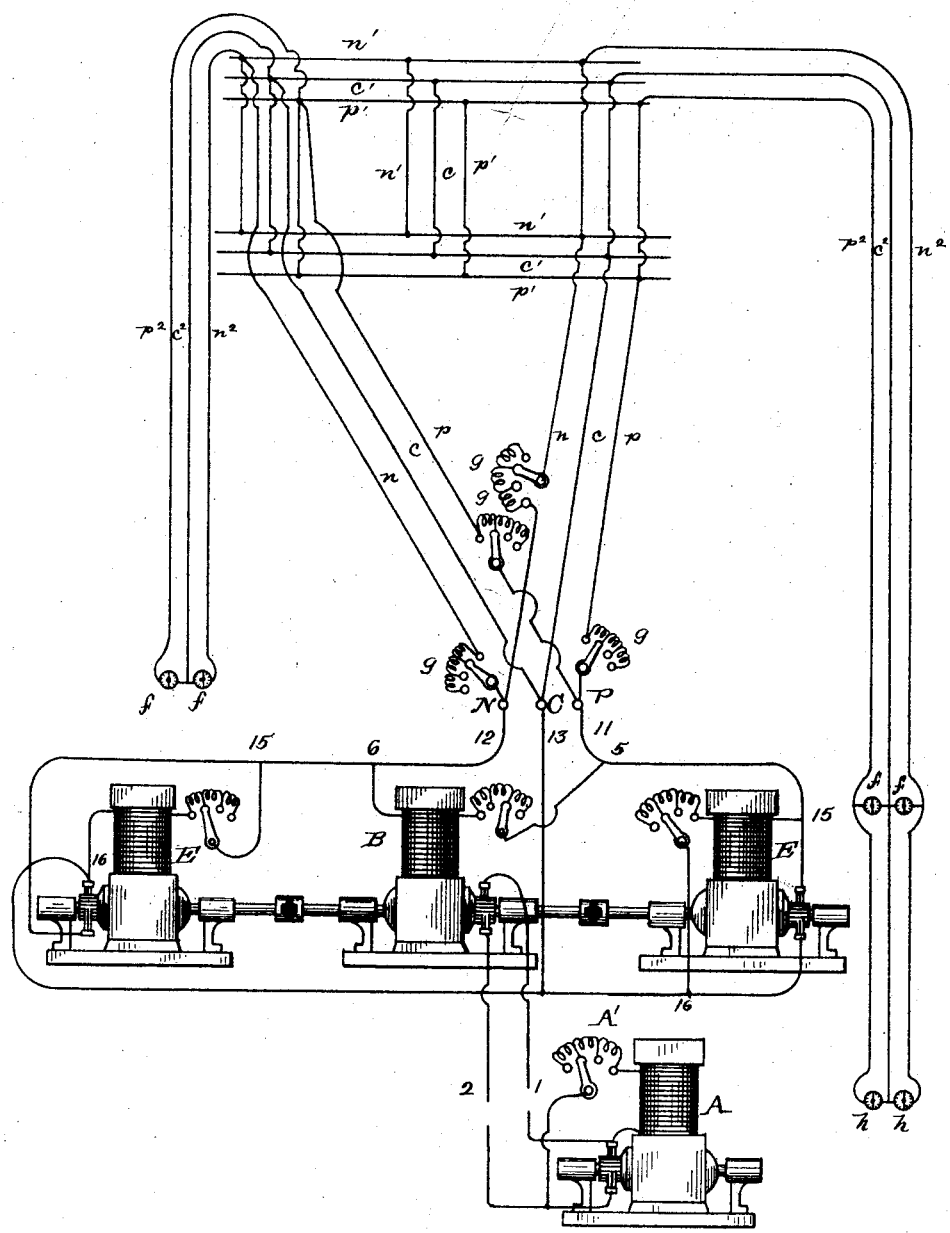

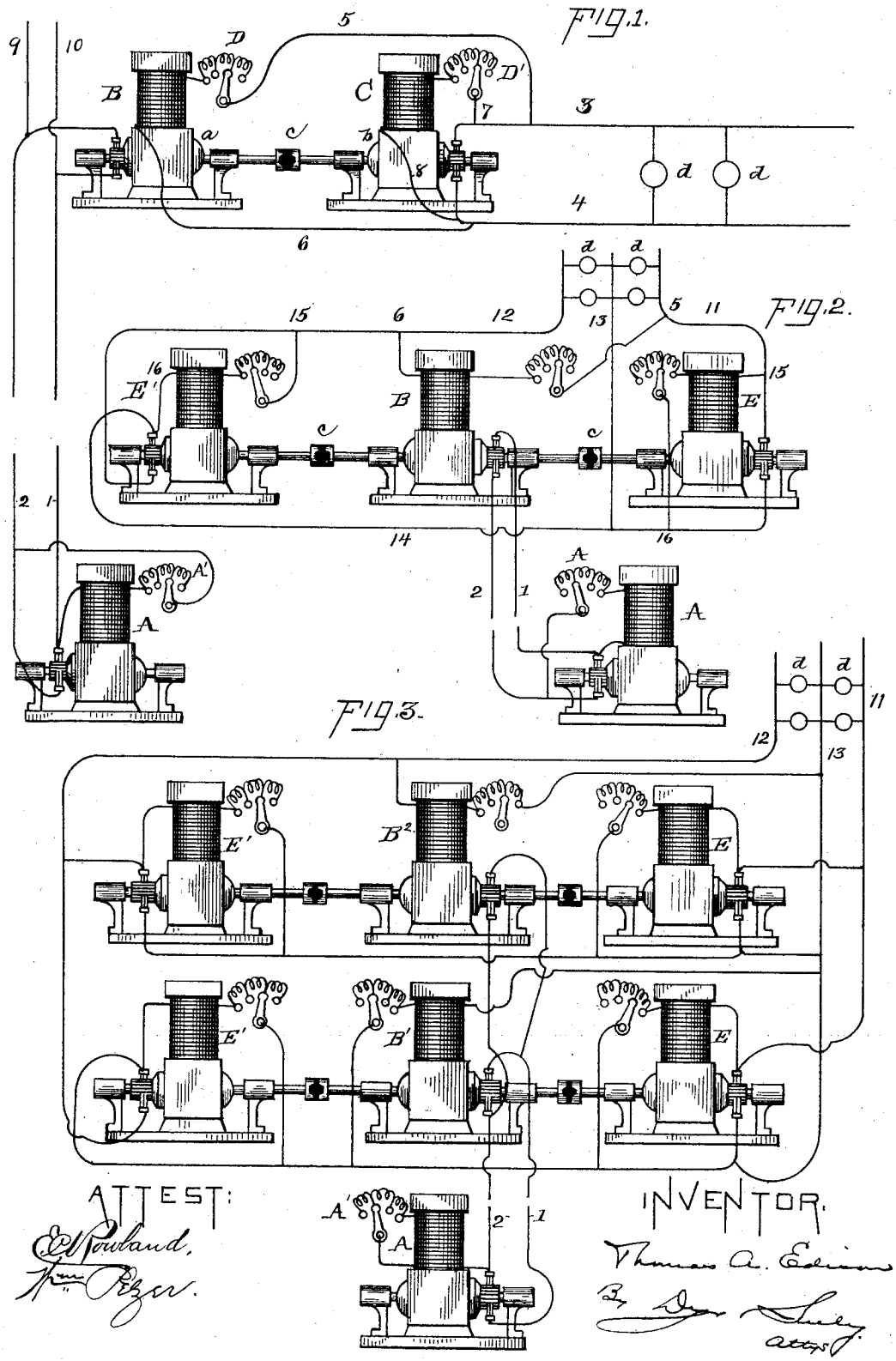

UNITED STATES PATENT OFFICE.

THOMAS A. EDISON, OF LLEWELLYN PARK, NEW JERSEY.

SYSTEM OF ELECTRICAL DISTRIBUTION.

SPECIFICATION forming part of Letters Patent No. 369,441, dated September 6, 1887.

Application filed December 16, 1886. Serial No. 221,795. (No model.)

*To all whom it may concern:*

Be it known that I, THOMAS A. EDISON, of Llewellyn Park, in the county of Essex and State of New Jersey, have invented a certain new and useful Improvement in Systems of Electrical Distribution, (Case No. 708,) of which the following is a specification.

My invention relates to systems of electrical distribution of that character in which high-tension currents are employed, generated at a station situated at a distance from the district to be supplied, and transmitted to a sub-station by small conductors, and from which sub-station currents of lower tension, adapted for use in electric lighting or for other domestic or business purposes, are supplied to such district.

The object of my invention is to provide a simple and efficient system of this general character, which may be readily and conveniently regulated, and which shall employ continuous currents, thereby doing away with the danger to life which arises when high-tension alternating currents are used.

My invention may be employed either with a two-wire or multiple-arc system or with the three-wire or compensating multiple-series system.

My invention is illustrated in the annexed drawings, in which Figure 1 is a diagram of a system embodying said invention arranged as a simple two-wire multiple-arc system; Fig. 2, a diagram showing a simple arrangement for supplying a multiple-series system; Fig. 3, a diagram showing the supplying of a three-wire system in a somewhat different manner; and Fig. 4 a diagram of the complete connections of the three-wire distributing system.

Referring, first, more especially to Fig. 1, A represents a dynamo-electric machine adapted to generate a current of high tension, and which is situated at a place where power is economically available, and which may be termed the "main station." It is evident that any desired number of generators A may be placed at the main station and connected in series, multiple arc, or multiple series, as may be desired. The generator A has an adjustable resistance, A', in its field-circuit for regulating it.

From the terminals of generator A a circuit, 1 2, extends, which may be composed of small conductors, since it is required to convey only the high-tension current. This circuit extends to a sub-station situated within or near the district to be supplied with current, and at this sub-station is placed an electro-dynamic motor, B, having its armature-coils in the high-tension circuit 1 2. The armature-shaft $a$ of this motor is directly connected mechanically with the armature-shaft $b$ of a dynamo-electric machine, C, which is wound so as to generate a continuous current of much lower tension than that supplied to motor B—that is, a current adapted for incandescent electric lighting and similar purposes. The same piece of shafting may extend through both armatures; but I prefer to introduce between them an insulating-joint, $c$. From the commutator of generator C a circuit, 3 4, extends, with which are connected in any suitable manner incandescent electric lamps, electric motors, or other translating devices, $d\,d$, the same being thus supplied with current.

I prefer to energize the field-magnets of the motor B and generator C both from the low-tension circuit 3 4. To this end a multiple-arc circuit, 5 6, is brought from circuit 3 4, which includes the coils of the field-magnet of the motor, and also a circuit, 7 8, which includes the field-coils of the generator. Each of these field-circuits is provided with an adjustable resistance, D or D', whereby the speed of the motor and the generation of current by the generator are regulated.

Any suitable number of sub-stations may be supplied from the main circuit 1 2, each being provided with the devices just described. This is indicated by the circuit 9 10, extending in multiple arc from 1 2, and which may extend to one of such other sub-stations.

By means of the insulating-joint $c$ the high-tension circuits are completely cut off from those of low tension, so that if an accidental ground-connection should occur through the base of one machine no current therefrom can in any way reach the circuits of the other machine.

In the arrangement shown in Fig. 2 the generator A is arranged at the main station, as before, and supplies current to motor B at the sub-station. This motor drives by direct connection two low-tension generators, E and E', and these generators are connected in series in a circuit, 11 12, while a conductor, 13, extends from the joining conductor 14, whereby the two generators are made to form the divided source of supply of a compensating or three-wire system. The field of the motor is energized, as before, by a circuit, 5 6, off the low-tension circuit, while the fields of the generators are energized each by a circuit, 15 16, off one side of the said low-tension circuit. Adjustable resistances are placed in the field-circuits, as before explained. The electric lamps or other translating devices, $d$ $d$, are in multiple series across the circuit 11 13 12, as will be well understood. By adjusting the resistance in the field of the motor the speed of both generators is changed and the whole current supplied to the circuit 11 13 12 is regulated, while each side of the circuit is separately regulated by the separate adjustment of the generator field-circuit resistances. Insulating-joints $c$ $c$ are interpolated in the armature-shafts, as before.

Fig. 3 shows the arrangement of several sets of motors and generators at a sub-station, all supplying the same three-wire circuit, 11 13 12. Two motors, B' and B², are connected in multiple arc with the high-tension circuit 1 2 from generator A. There may be any desired number of such motors so connected. Each of these motors runs a pair of generators, and each pair of generators is connected in series across the low-tension circuit, the group of generators being thus in multiple series, there being two in series in each multiple-arc circuit. The compensating-conductor 13 is connected between each pair of generators, and the translating devices $d$ $d$ are connected across the three-wire circuit, as already explained. The regulation is performed as in Fig. 2.

In all the preceding figures I have shown, for illustration, translating devices placed directly upon the low-tension circuit. The preferred arrangement for a distributing system is, however, shown in Fig. 4, the arrangement at main and sub stations being the same as is shown in Fig. 2.

The three-wire circuit 11 13 12 extends to suitable terminal points or omnibus conductors, P C N, within the station, from which extend two or more feeding-circuits, $p\,c\,n$. These extend to different points of a system of intersecting and connected positive, negative, and compensating main or lighting conductors, $p'\,c'\,n'$, from which the house-circuits, (not shown,) including translating devices in multiple series, extend. From the terminals of each feeder an indicating-circuit, $p^2\,c^2\,n^2$, extends to the sub-station, where each is connected to suitable electrical indicators, $f\,f$, by which the pressure on each side of the system at all the different parts of the district is shown.

Each feeding-circuit is provided with an adjustable resistance, $g$, in each side thereof, whereby the current supplied by each feeder to its particular part of the district is varied and regulated as changes occur in the distribution of the translating devices in circuit. Preferably one of the indicating-circuits—or a separate circuit—is continued back to the main station, and is there connected with indicators $h\,h$, so that the tension in the system of conductors is shown at the main station. In accordance with these indications the main-station generator may be regulated to keep the proper constant pressure at the terminals of this particular feeder, which thus serves as a standard feeder, the one or more other feeders being regulated separately at the sub-station to keep them at the same pressure as the standard. The two sides of the system may also be separately regulated to maintain their balance by the adjustment of the field-circuit resistances of the generators.

It is evident that the arrangement shown in Fig. 1 may be and is in practice employed to supply a two-wire multiple-arc system of feeders and connected mains, as will be well understood, and also that the two or more multiple series of generators shown in Fig. 3 and driven by multiple-arc motors may be employed with the system of feeders and mains, as well as the arrangement shown in connection with such system.

What I claim is—

1. In a system of electrical distribution, the combination of a source of electricity of high tension, a circuit extending therefrom, an electro-dynamic motor connected with said circuit, a dynamo-electric machine generating a current of lower tension, a direct mechanical connection between the armature of said motor and that of said generator, and translating devices supplied by said generator, substantially as set forth.

2. In a system of electrical distribution, the combination of a source of electricity of high tension, a circuit extending therefrom, an electro-dynamic motor connected with said circuit, a dynamo-electric machine generating a current of lower tension, translating devices supplied by said generator, a direct mechanical connection between the armature of said motor and that of said generator, and means for regulating the speed of said motor, substantially as set forth.

3. In a system of electrical distribution, the combination of a source of electricity of high tension, a circuit extending therefrom, an electro-dynamic motor connected with said circuit, a dynamo-electric machine generating a current of lower tension, translating devices supplied by said generator, a direct mechanical connection between the armature of said generator and that of said motor, and means for regulating the generation of current by said generator, substantially as set forth.

4. In a system of electrical distribution, the combination of a source of electricity of high tension, a circuit extending therefrom, an electro-dynamic motor connected with said circuit, a dynamo-electric machine generating a current of lower tension, a direct electrically-insulating mechanical connection between the armature of said motor and that of said generator, and translating devices supplied by said generator, substantially as set forth.

5. In a system of electrical distribution, the combination of a source of electricity of high tension, a circuit extending therefrom, an electro-dynamic motor connected with said circuit, a dynamo-electric machine generating a current of lower tension, an insulating-coupling between the armature-shaft of said motor and that of said generator, and translating devices supplied by said generator, substantially as set forth.

6. In a system of electrical distribution, the combination of a source of electricity of high tension, a circuit extending therefrom, an electro-dynamic motor having its armature connected with said circuit, a dynamo-electric machine driven by said motor and generating a current of lower tension, a circuit extending from said generator and supplying translating devices, and a circuit extending from said low-tension circuit for energizing the field-magnet of said motor, substantially as set forth.

7. In a system of electrical distribution, the combination of a source of electricity of high tension, a circuit extending therefrom, an electro-dynamic motor connected with said circuit, a dynamo-electric machine, driven by said motor, generating a current of lower tension, a circuit extending from said generator supplying translating devices, and a circuit from said low-tension circuit for energizing the field-magnet of said generator, substantially as set forth.

8. In a system of electrical distribution, the combination of a source of electricity of high tension, a circuit extending therefrom, an electro-dynamic motor having its armature connected with said circuit, a dynamo-electric machine, driven by said motor, generating a current of lower tension, a circuit extending therefrom and supplying translating devices, and multiple-arc circuits from said low-tension circuit, one for energizing the field-magnet of said motor, the other for energizing that of said generator, substantially as set forth.

9. In a system of electrical distribution, the combination of a source of electricity of high tension, a circuit extending therefrom, an electro-dynamic motor connected with said circuit, a dynamo-electric machine, generating a current of lower tension, driven by said motor and supplying translating devices, means for regulating the current on such high-tension circuit, and means for regulating said low-tension generator, substantially as set forth.

10. In a system of electrical distribution, the combination of a source of electricity of high tension, a circuit extending therefrom, two or more electro-dynamic motors connected with said circuit in multiple arc, and dynamo-electric machines, driven by said motors, generating currents of lower tension and supplying translating devices, substantially as set forth.

11. In a system of electrical distribution, the combination of a source of electricity of high tension, two or more electro-dynamic motors connected in multiple arc with said circuit, and dynamo-electric machines generating currents of lower tension and supplying translating devices, and each having its armature directly connected mechanically with the armature of one of said motors, substantially as set forth.

12. In a system of electrical distribution, the combination of a source of electricity of high tension, a circuit extending therefrom, an electro-dynamic motor connected with said circuit, and two dynamo-electric machines, each having its armature directly connected mechanically with the armature of said motor and supplying currents of lower tension to translating devices, substantially as set forth.

13. In a system of electrical distribution, the combination of a source of electricity of high tension, a circuit extending therefrom, an electro-dynamic motor connected with said circuit, and two dynamo-electric machines, generating currents of lower tension, driven by said motor, said generators being connected in series and arranged to form the divided source of a three-wire or compensating system of electrical distribution, substantially as set forth.

14. In a system of electrical distribution, the combination of a source of electricity of high tension, a circuit extending therefrom, an electro-dynamic motor connected with said circuit, a dynamo-electric machine driven by said motor and generating a current of lower tension, two or more feeding-circuits extending from said generator, and a connected system of main or lighting conductors, with which said feeding-circuits are connected, substantially as set forth.

15. In a system of electrical distribution, the combination of a source of electricity of high tension, a circuit extending therefrom to a sub-station, an electro-dynamic motor at said sub-station, connected with said circuit, a dynamo-electric machine, driven by said motor, generating current of lower tension, feeding-circuits extending from said generator, a connected system of main or lighting conductors, with which said feeding-circuits are connected, indicating-circuits extending from the terminals of said feeding-circuits to indicators at the sub-station, and means for regulating the current of each feeding-circuit, substantially as set forth.

16. In a system of electrical distribution, the combination of a source of electricity of high tension, a circuit extending therefrom, an electro-dynamic motor connected with said circuit, two dynamo electric machines, driven by said motor, generating currents of lower tension and connected in series, two or more three-wire feeding-circuits extending from said generators, and a three-wire system of main or lighting conductors, with which said feeding-circuits are connected, substantially as set forth.

This specification signed and witnessed this 10th day of December, 1886.

THOS. A. EDISON.

Witnesses:
 WM. PEZER,
 E. C. ROWLAND.